United States Patent [19]
Welsh et al.

[11] Patent Number: 5,858,909
[45] Date of Patent: Jan. 12, 1999

[54] SILICEOUS OXIDE COMPRISING AN ALKALINE CONSTITUENT

[75] Inventors: William A. Welsh, Highland, Md.; John F. Terbot, West Chester, Ohio

[73] Assignee: W. R. Grace & Co.-Conn., New York, N.Y.

[21] Appl. No.: 720,339

[22] Filed: Sep. 27, 1996

[51] Int. Cl.$^6$ .............................. B01J 21/08; B01J 20/10
[52] U.S. Cl. ...................... 502/243; 502/233; 502/237; 502/411; 423/335; 423/338; 423/339
[58] Field of Search .................... 502/233, 237, 502/240, 243, 407, 408, 411; 423/335, 338, 339

[56] References Cited

U.S. PATENT DOCUMENTS

| | | | |
|---|---|---|---|
| 3,928,541 | 12/1975 | Wason | 423/339 |
| 4,124,562 | 11/1978 | Yui et al. | 260/42.14 |
| 4,153,680 | 5/1979 | Seybert | 424/49 |
| 4,289,513 | 9/1981 | Brownhill et al. | 96/135 |
| 4,296,000 | 10/1981 | Wason | 502/411 |
| 4,303,641 | 12/1981 | DeWolf II et al. | 424/49 |
| 4,357,451 | 11/1982 | McDaniel | 526/106 |
| 4,563,441 | 1/1986 | McLaughlin et al. | 502/410 |
| 4,749,590 | 6/1988 | Klingen et al. | 427/54.1 |
| 4,880,650 | 11/1989 | Okamura et al. | 426/330.4 |
| 4,895,891 | 1/1990 | Schumann et al. | 524/493 |
| 5,100,930 | 3/1992 | Fukui et al. | 523/100 |
| 5,177,277 | 1/1993 | Eryman et al. | 585/255 |
| 5,252,762 | 10/1993 | Denton | 502/408 |
| 5,318,790 | 6/1994 | Houston et al. | 502/407 |
| 5,320,778 | 6/1994 | Miksic et al. | 252/389.54 |
| 5,342,876 | 8/1994 | Abe et al. | 524/493 |
| 5,346,944 | 9/1994 | Hayashida et al. | 524/451 |
| 5,364,380 | 11/1994 | Tanzer et al. | 604/359 |
| 5,405,687 | 4/1995 | Yamamoto | 428/261 |
| 5,407,442 | 4/1995 | Karapasha | 604/359 |
| 5,415,907 | 5/1995 | Inoue et al. | 428/36.2 |
| 5,436,282 | 7/1995 | Gustafson et al. | 523/102 |
| 5,510,413 | 4/1996 | McCullough et al. | 524/450 |

FOREIGN PATENT DOCUMENTS

| | | | |
|---|---|---|---|
| 0708137 | 4/1996 | European Pat. Off. | C08K 3/36 |
| 3713600 | 11/1988 | Germany | B01J 20/10 |
| 58-111625 | 7/1983 | Japan | A01K 1/015 |
| 58-128146 | 7/1983 | Japan | B01J 20/10 |
| 2107312 | 4/1990 | Japan | B01D 53/26 |
| 4246444 | 9/1992 | Japan | C08L 23/02 |
| 5049918 | 3/1993 | Japan | B01J 20/04 |
| 8198616 | 8/1996 | Japan | C01B 33/193 |
| 0745204 | 2/1956 | United Kingdom . | |
| 9215396 | 9/1992 | WIPO . | |

*Primary Examiner*—Glenn Caldarola
*Assistant Examiner*—In Suk Bullock
*Attorney, Agent, or Firm*—Charles A. Cross

[57] ABSTRACT

Siliceous oxides having a combination of low total volatiles content and basic pH are useful as odor control agents in organic resin systems, especially polyolefin-based systems. These modified siliceous oxides advantageously reduce odor and off-trade while minimizing discoloration of the resin. The adsorbents are especially useful for resin systems containing fatty acid amide slip aids.

7 Claims, No Drawings

SILICEOUS OXIDE COMPRISING AN ALKALINE CONSTITUENT

BACKGROUND OF THE INVENTION

The desire to remove or avoid unwanted odors is present in almost every environment. This desire is especially evident in the context of consumer products where an unpleasant odor associated with a product can have an adverse impact on the product's marketability, regardless of product efficacy.

In many instances, the manufacture of consumer products involves the use of substances which may create an odor problem if a sufficient amount of the substance(s) is present in the product when it is sold to the consumer. Often, these odiferous substances are removed or become dissipated prior to purchase of the product by the consumer. Nevertheless, there is often a need to combat undesired odors in many products. This need may be accentuated in instances where the time between manufacture and sale of the product becomes shortened.

To some extent, odor problems can be addressed by masking with fragrances or by avoiding use of the odor-causing substance in the manufacture of the product. In other cases, certain adsorbents such as molecular sieves or conventional silica gels have been used to combat odor. Unfortunately, the use of such conventional adsorbents may produce adverse side effects on the product (e.g. discoloration of the product, creation of secondary odors).

Thus, there remains a need for improved adsorbents useful for odor removal applications which avoid adverse side effects such as discoloration and development of secondary odors.

SUMMARY OF THE INVENTION

New siliceous oxide compositions have been found which provide excellent odor adsorption without adverse side effects on the resultant products. These compositions are especially useful for combating odors associated with plastics.

In one aspect, the invention encompasses siliceous adsorbent compositions having a surface hydroxyl content such that the material has a total volatiles content of 0.4–2.0 wt. % (measured as weight loss on heating to 954° C. for two hours) and a pH (at 5 wt. % (dry basis) concentration in water) of at least about 7, more preferably about 8–12. The siliceous adsorbent is preferably porous. Siliceous adsorbent is preferably based on or derived from a material selected from the group consisting of silica gels, diatomaceous earth, precipitated silicas, acid-treated clays and clay-derived silicas. Silica gels are most preferred.

In another aspect, the invention encompasses a method of modifying a siliceous material to make an adsorbent which provides odor removal capability without adverse side effects. The method comprises (a) treating the siliceous material to adjust its surface hydroxyl content to achieve a total volatiles (TV) of 0.4–2.0 wt. %, and (b) adding an alkaline substance to the material to increase its pH (at 5 wt. % (dry basis) concentration in water) to at least about 7.

In another aspect, the invention encompasses plastic compositions which comprise an organic matrix containing a siliceous adsorbent composition having a surface hydroxyl content such that the adsorbent has a TV of 0.4–2.0 wt. % and a pH (at 5 wt. % (dry basis) concentration in water) of at least about 7. The organic matrix is preferably a polymeric matrix. The organic matrix may contain conventional additives. The invention is especially useful where the plastic composition is a film and/or where the organic matrix contains amide additive(s).

DETAILED DESCRIPTION OF THE INVENTION

The invention is based on the discovery that siliceous adsorbents with certain hydroxyl content (TV) and pH characteristics can be advantageously employed in plastic compositions to remove odors while avoiding side effects such as discoloration or development of secondary odors.

The adsorbents of the invention which are suitable for odor removal are primarily characterized by their surface hydroxyl content and their pH. The compositions of the invention preferably have a surface hydroxyl content such that the adsorbent has a TV of 0.4–2.0 wt. %, more preferably about 0.5–1.5 wt. %. The pH of the adsorbent is preferably at least 7, more preferably about 8–12, most preferably about 8.5–11. The pH of the adsorbent is measured at 5 wt. % (dry basis) concentration in deionized water.

The adsorbents of the invention preferably are also characterized by their porosity, particle size and surface area. The adsorbents of the invention preferably have a total pore volume of at least about 0.1 ml/g, more preferably about 0.15–2.0 ml/g, most preferably about 0.15–1.0 ml/g. The pore volume is preferably measured by nitrogen BET method after removal of all free water by any appropriate known activation procedure which avoids or minimizes any effects on the pore volume and surface area of the underlying solid; preferably the sample is activated by heating to 260°–315° C. for 2 hours in vacuum. The adsorbents of the invention preferably have an average particle size (measured by Malvern light scattering) of about 0.1–30 $\mu$m, more preferably about 0.5–15 $\mu$m, most preferably about 2–12 $\mu$m. The adsorbents of the invention preferably have a surface area of at least about 30 m$^2$/g, more preferably about 50–1000 m$^2$/g, most preferably about 100–500 m$^2$/g. The surface area is also preferably measured by nitrogen BET method.

The adsorbents of the invention are preferably siliceous oxide materials. The adsorbents are preferably selected from the group consisting of silica gels, diatomaceous earth, precipitated silicas, acid-treated clays and clay-derived silicas. Silica gels, especially silica xerogels such as regular density xerogels, are most preferred.

Typically, to achieve the desired pH, it is necessary to add a base component to the adsorbent. Thus, the adsorbent would typically contain the base either (1) on its outer surface, (2) in its pores, (3) in its internal structure, or (4) any combination of (1)–(3). Preferred base components are sodium hydroxide, and sodium carbonate (Na$_2$CO$_3$). The amount of base component present may vary depending of the nature of the siliceous material and the selected base. The proportions are preferably those necessary to achieve an adsorbent having a pH in the above mentioned ranges. For a silica xerogel, the amount of base added is preferably about 1.0–5.0 wt. % based on the dry weight of silica present.

The plastic composition may be any conventional polymer-containing plastic composition. Typical plastics preferably comprise olefin-containing polymer resins such as polyethylene, polypropylene, polyethylene terephthalate, polystyrene, etc. See, for example, the olefin polymers disclosed in U.S. Pat. Nos. 5,346,944 and 5,100,930. The disclosures of these patents are incorporated herein by reference. The plastic composition is preferably a thermoplastic.

The plastic composition may contain other components in addition to the polymer resin. Plastic compositions often contain additives such as lubricants, slip aids, antioxidants, and antistatic agents. Some examples of additives are disclosed in the above-mentioned patents. The plastic composition may also include fillers or pigments. The invention is believed to be especially useful for plastic compositions which contain amide additives, e.g. fatty acid amides, especially $C_{18}$–$C_{22}$ fatty acid amides such as erucamide, oleamide, stearamide, etc. Amides are commonly used as slip aids or antistatic agents.

The amount of the adsorbent of the invention used in the plastic composition may vary depending on the desired use of the resulting plastic composition, the degree of odor adsorption required, etc. Preferably, the plastic composition contains at least 0.01 wt. % of the adsorbent, more preferably about 0.05–5.0 wt. %, most preferably about 0.1–0.5 wt. %.

Methods for making the initial (unmodified) siliceous materials are well known in the art. Where the initial siliceous material is a silica gel, it is preferably made according to one of the processes described in U.S. Pat. Nos. 4,153,680 or 4,303,641, the disclosures of which are incorporated herein by reference. Examples of methods for making precipitated silicas and clay-derived silicas are shown in U.S. Pat. No. 3,928,541 and WO92/15396 respectively.

Most known siliceous oxide materials require modification to meet the hydroxyl and pH requirements of the invention. While these modifications can be performed in any desired order or simultaneously, preferably the pH adjustment is performed before or during the adjustment of the hydroxyl content.

The pH adjustment most often involves addition of a base to the siliceous oxide material. The base may be added to the siliceous oxide by any suitable technique. Preferably, the base is added by impregnation, deposition (on part or all of the surface) or physical compounding. Most preferably, the base is added in a co-milling step wherein the base is added to the mill while the siliceous oxide undergoes milling. In such instances, the base is preferably added as a solution which is injected into the mill. Alternatively, the siliceous oxide can be slurried with a basic solution followed by spray drying. In the unlikely event that the siliceous oxide is too basic in nature, acid may be added via a mild acidic washing (e.g. pH >4) or other suitable technique.

The hydroxyl content of the siliceous oxide may be adjusted downward by any known dehydroxylation technique such as those described in European Patent Application 641191-A published on Mar. 8, 1995, the disclosure of which is incorporated herein by reference. Thermal dehydroxylation is generally preferred because it is more economical for large scale manufacture. Preferably, the thermal dehydroxylation is performed for about 2–4 hours at 500°–800° C. in air or nitrogen (e.g. in a muffle furnace or rotary calciner). Preferably excessive dehydroxylation (to <0.4 T.V.) is avoided.

Reversal of surface dehydroxylation does not occur rapidly on wetting of the product at room temperature. Nevertheless, it may be desirable to conduct any aqueous processing (e.g. impregnation with a base solution) before the dehydroxylation step merely as a matter of efficiency. For most plastics applications, it is preferable that the siliceous adsorbent be void of free water before incorporation into the plastic. The presence of free water can be problematic, e.g. outgassing may occur during processing of the polymer under polymer melt flow conditions.

The porosity and surface area of the siliceous oxide are often largely determined by the synthesis of the initial siliceous oxide material as is well know in the art. In some circumstances, it may be possible to modify these characteristics via known techniques (e.g. acid leaching). To some extent, the modifications to achieve the desired surface hydroxyl content and pH may result in some reduction in surface area. The siliceous oxide material may be subjected to comminution or classification to achieve the desired particle size distribution for the intended use or to facilitate combination of the siliceous oxide adsorbent with the plastic formulation.

The adsorbent of the invention may be combined with the desired plastic using techniques known in the art for incorporation of fillers and antiblocking agents into plastic compositions. If desired, the adsorbent of the invention may be formulated into a plastic masterbatch containing 5–25 wt. % of the adsorbent. The masterbatch may be then combined with additional plastic to achieve the final desired loading. The processing of the plastic for its ultimate use would remain largely unaffected by the addition of the adsorbent of the invention. For example, the resulting plastic compositions may be formed into films by extrusion according to conventional techniques.

These and other aspects of the invention are illustrated by the following examples.

EXAMPLE 1

A slurry of 200 g. (dry basis) of Grace Davison Syloid 63 (regular density silica gel, pH=4.1@5 wt. % in water) in 1500 g. deionized water was formed. The pH of the slurry was adjusted to 11.9 by addition of concentrated sodium carbonate solution (1390 g. $Na_2CO_3$/16 L. deionized water). The slurry was aged for 15 minutes at the above pH. The slurry was then filtered and the treated silica was washed with 1500 ml. deionized water. The resulting silica was recovered by filtration and oven dried overnight at 110° C.

The dried silica was deagglomerated in a Waring blender and then dehydroxylated by heating in a muffle furnace at 600° C. for 2 hours in a nitrogen atmosphere. The silica was then cooled in a nitrogen atmosphere to recover the silica odor adsorbent product.

The silica adsorbent had a pH of 11.7 measured as a 5 wt. % (dry basis) slurry in deionized water. The adsorbent had a total volatiles content (measured as loss on ignition at 954° C.) of about 0.5%, pore volume of 0.16 ml/g and surface area of 113 $m^2$/g, both measured by nitrogen BET.

EXAMPLE 2

A silica gel was prepared in the manner described in example 1 except that the pH of the slurry was adjusted to only about 9.5 by addition of the sodium carbonate solution.

The resulting silica adsorbent had a pH of 9.2 measured as a 5 wt. % (dry basis) slurry in deionized water. The adsorbent had a total volatiles content of 0.57%, pore volume of 0.25 ml/g and surface area of 121 $m^2$/g.

Comparison Example

A sample of the same starting Syloid 63 silica gel as in example 1 was calcined for two hours at 700° C. in the manner described in example 1. The resulting adsorbent had a pore volume of 0.22 ml/g, a surface area of 408 $m^2$/g, and a 5% slurry pH corresponding to the starting silica gel.

Discoloration Test

The modified silica gels obtained in the above examples were each separately combined with a low density polyethylene (LDPE) resin and a fatty acid amide slip aid whereby the resulting compositions contained about 0.3 wt. % each of amide and silica. A portion of each resulting plastics was then heated for about 90 minutes, and the color of the resulting materials was compared using a spectrophotometer. As a control samples, similar compositions were heat treated without the silica and without both the silica and the fatty acid amide. As a further comparison, similar preparations were made except that equivalent amounts of zeolite ZSM-5, zeolite 5A and untreated Syloid 63 silica gel were separately substituted for the modified silica gels. The coloration on heating is reported as Delta E in Table 1 below from a standard white value. The color level produced by the Syloid 63 silica gel and the ZSM-5 is considered unacceptable.

Non-Polymer Odor

A portion of the above compositions prepared for the discoloration test were heated for a total of 90 minutes. The samples were then ranked for non-polymer odor (i.e., odor other than LDPE) by a single tester. The results are shown in Table 1 where rankings of 4 or greater are considered unacceptable.

Water Taste Testing

The adsorbents of examples 1 and 2 were combined with LDPE and slip aid in the proportions described above. The resulting compositions were then extruded into films about 40 $\mu$m thick. After several weeks of storage, a 6 g. portion of each film was placed in a jar containing about 900 ml of deionized water which was sealed for about 20 hours. The water from the jars was then ranked for taste by a skilled panel. Based on reference to the rankings of control samples (using an equivalent amount of adsorbent-free film), the percent of off-taste was determined. These results are also shown in Table 1.

TABLE 1

| Adsorbent | CMC Delta E Color Change | Non-Polymer Odor | % Water Off-Taste |
|---|---|---|---|
| Ex. 1 modified silica gel | 5.57 | 2 | 59% |
| Ex. 2 modified silica gel | 6.49 | 3 | 63% |
| Dehydroxylated silica gel | 6.05 | 5 | — |
| Syloid 63 silica gel | 11.94 | 6.5 | 63% |
| ZSM-5 | 9.10 | 2 | — |
| Zeolite 5A | 5.03 | 0.5 | 89% |
| LDPE with fatty acid amide | 4.33 | 1 | 89% |
| LDPE | 4.16 | 0 | — |

What is claimed is:

1. A particulate siliceous oxide composition wherein said oxide comprises an alkaline constituent, has a pore volume of at least 0.1 ml/g., an average particle size by Malvern of about 0.1–30 $\mu$m, a total volatiles content of about 0.4–2.0 wt. %, and a pH measured at 5 wt. % dry basis siliceous oxide concentration in deionized water of about 8.5–11.

2. The composition of claim 1 wherein the concentration of said alkaline constituent is greater at the surface of said siliceous oxide particles than in the interior of said particles.

3. The composition of claim 1 wherein said siliceous oxide contains about 1–5 wt. % of said alkaline constituent measured on a dry basis.

4. The composition of claim 1 wherein said alkaline constituent is selected from the group consisting of sodium carbonate, sodium hydroxide and mixtures thereof.

5. The composition of claim 1 wherein said siliceous oxide is selected from the group consisting of silica gels, diatomaceous earth, precipitated silicas, acid-treated clays and clay-derived silicas.

6. The composition of claim 5 wherein said siliceous oxide is a silica gel.

7. The composition of claim 5 wherein said siliceous oxide has a pore volume of about 0.1 to 1.0 ml/g.

* * * * *